Patented Dec. 11, 1934

1,983,730

UNITED STATES PATENT OFFICE 1,983,730

CAOUTCHOUC-LIKE MATERIAL

Robert Beyer, Brooklyn, N. Y., assignor to Robert Beyer Corporation, New York, N. Y., a corporation of New York No Drawing. Application September 27, 1929
Serial No. 395,763

7 Claims. (Cl. 106—23)

This invention relates to caoutchouc-like material and has for its object the provision, as a new article of manufacture, of a novel caoutchouc-like material, and a method of making the same. More particularly the invention aims to provide a novel caoutchouc-like material which when vulcanized displays physical characteristics similar to natural caoutchouc when vulcanized, and also to provide a method of making such material from starch or other carbohydrate.

The heretofore customary methods of synthesizing caoutchouc-like compounds produce only materials which display but a minor part of the physical characteristics of natural caoutchouc and which can only be used in relatively small quantities along with natural caoutchouc. This is more particularly true when it is sought to obtain the soft resilient types of vulcanized rubber which are customary in automobile tires and tubes. The heretofore synthesized caoutchouc-like compounds may be used in relatively larger quantities when hard rubber products are being produced where properties of resiliency, flexibility and elasticity are not sought after.

In the heretofore customary methods of synthesizing caoutchouc-like materials, as notable in Germany during the World War, it has been customary to attempt to reverse the known stages in the destructive distillation of natural caoutchouc. Thus it is known that the breaking down of natural caoutchouc produces isoprene (methylbutadiene). The synthesis of isoprene is known and as a consequence this substance has been commonly suggested and used as the starting point in the production of caoutchouc-like compounds. Dimethylbutadiene and erythrene have also been used as starting points in rubber synthesis. Starting with isoprene or similar substances, polymerization is depended upon to give caoutchouc or rubber.

Various methods have been suggested and used to polymerize isoprene and the like, chief of which are heat polymerization, sodium polymerization and sodium-carbon-dioxide polymerization. A cold polymerization product suitable only for hard rubber has been produced by holding dimethylbutadiene at a temperature of 30° C. for three months, small amounts of already polymerized material being added to hasten the process. Only the heat polymerization method has ever attained any considerable commercial importance. This method produced in Germany during the World War a substantial tonnage of material which mixed with available stocks of natural rubber materially extended the latter.

Caoutchouc-like material made by these heretofore customary methods lacks plasticity, and must be treated with special care on the rubber mills. In some cases it is even necessary to add certain oils in order to work the material at all on the mills. The material is unstable, making it necessary to add basic substances in the nature of piperidine, aldehyde ammonia or 1,8-diaminonaphthalene. These substances protect the caoutchouc-like material from decomposition and also act to accelerate vulcanization. These heretofore synthesized caoutchouc-like materials also lack elasticity, and basic oils and even mineral oils are added to overcome this difficulty. These materials are also deficient in adhesive strength.

I have discovered that starch can be converted into a caoutchouc-like material which behaves in substantially all important respects like natural caoutchouc, and which vulcanizes with the customary compounding agents to form a vulcanized product possessing substantially the characteristic properties, and to substantially the same degree, of vulcanized natural caoutchouc. My present invention, based on that discovery, contemplates a process of converting starch to such caoutchouc-like material. In its complete aspect, this process involves five stages or treatment operations which may be generally defined as follows:

1. Primary conversion of the starch in the presence of one or more appropriate salts and water and under appropriate temperature conditions, followed by partial dehydration.
2. Conditioning of the product of the primary conversion stage to render it immiscible with water.
3. Conditioning treatment to render unconverted starch and the like amenable to removal by washing.
4. Coagulation of the caoutchouc-like material.
5. Washing.

The final product of the foregoing complete treatment operation is a caoutchouc-like material displaying, when vulcanized, physical characteristics remarkably similar to natural caoutchouc.

The method of the invention may be carried out in various ways. By way of illustration I will now describe my present preferred practice, concluding with a specific example thereof. It is to be understood, however, that I do not intend or wish to be restricted to or bound by any explanations of reactions or phenomena which I give in an attempt to elucidate my present conception of the purpose and nature of the various stages of the complete process.

All starches appear available to some extent for the practice of the invention, but certain starches give far better practical results than others. I have obtained very satisfactory results with potato starch, cassava starch, and starches of similar nature. The starch is mixed in a dry state with one or more finely divided or pulverized salts, for example calcium chloride and zinc chloride, and a metallic soap, for example aluminum palmitate. An intimate dry mixture of the starch, salt and soap is effected in any appropriate apparatus whose action simulates that of a mortar and pestle. The mixing may advantageously be conducted in a pebble mill or tight tumbling barrel. Undue exposure of the mixture to the atmosphere should be avoided in order to prevent the absorption of moisture.

The resulting mixture is then slowly added to an appropriate amount of cold water in a mixing machine, provided with a jacket having cold water and steam connections. It is advantageous to add the dry mixture slowly to the water so that no lumps or cakes are formed which may be difficult to break down at a later stage. The mixing is conducted in the cold (at or below room temperature) and is continued until a smooth limpid paste is formed. This will ordinarily require around two hours. Heat is then applied very gradually until the mixture attains a temperature of about 140° F. (60° C.). Care should be taken that the temperature of the mixture does not exceed 160° F. (71° C.). The combined mixing and heating stage should take from three to five hours or longer, depending largely upon the type of starch employed.

In the course of the heating, the mixture becomes very stringy and mucilaginous and toward the end of the heating operation begins to thicken, somewhat in the nature of bread dough, and assumes a slightly brownish cast. As much water as possible is evaporated during the heating, thereby effecting a partial dehydration of the mixture.

The resulting pasty mass is now removed from the mixing machine and permitted to cool and then worked on a rubber mill with smooth rolls. The mill is permitted to run for some time without any heat on the rolls. During this short interval, say about fifteen minutes, the friction of the sticky mass gradually warms up the rolls. Heat is then turned into the rolls and the mass being worked is permitted to attain a temperature of about 140° F., at which temperature it is maintained until it loses sufficient moisture to become only tacky to the touch.

The temperature of the mass is then lowered to about 80° F. and a solvent for the metallic soap, present in the mass in a finely divided and dispersed state, is then added while working the material on the warm rolls. The solvent may be a volatile substance such as benzol, benzene, toluolene, xylene, gasoline, terpineol, acetone or any appropriate solvent for the metallic soap present. I have found it advantageous to use commercial benzol because of its relative cheapness and uniformity, but primarily because its boiling point is the temperature at which rubber products are customarily worked. Moreover, benzol upon evaporation imparts no residual odor to the material.

The addition of the solvent disperses metallic soap in a colloidal or peptized state throughout the mass. The peptized metallic soap immediately exerts a surprising effect upon the mass in that it begins to assume somewhat the appearance and nature of caoutchouc on the mill. The ultimate effect of the solvent is to produce a colloidal mass which snaps and crackles as entrapped gas or vapor, or both, burst through enclosing films of tough colloidal matter. The working of the mass on the mill, during which a temperature of about 140° F. may be attained, is continued until substantially all of the fine particles of metallic soap have disappeared, and until most of the solvent is driven off.

The material (with a faint trace of benzol therein) is next taken from the rubber mill and spread out in shallow pans at a depth of a few inches, say about two inches, and is thus permitted to stand exposed to the atmosphere for a period of about two days. During this period a reaction, apparently in the nature of fermentation, takes place and the material assumes a distinctly disagreeable and obnoxious odor, somewhat similar to that of decayed potatoes or fish. This reaction may be of enzymitic, diastatic or of micro-organism origin, although this has not been determined. Whatever the source or cause of the reaction, an effect is to render water-soluble that portion of the original starch which has up to this time remained unchanged or unconverted. In general the reaction appears to condition the greater portion of the unconverted or unreacted-upon matter for its ready removal and separation by washing with water from the converted or reacted-upon matter. The so-conditioned unconverted starch and the like is, in its new or conditioned form, not affected by acids or other rubber coagulants. During the reaction a tough skin forms on the surface of the material, but this is readily reincorporated during the subsequent milling.

The material is next removed from the pans and put on a caoutchouc washing machine having corrugated rolls, where it is treated with an appropriate caoutchouc coagulant. The caoutchouc coagulant may be an acid, such for example as acetic, hydrochloric or boric acid, or alcohol, such for example as methyl or ethyl alcohol, or the like. The coagulant is thoroughly milled into the mass until it has reached and affected all of the material on the mill. The result of this treatment is to place all of the converted or reacted-upon material, which has been in a water-miscible state, in a water immiscible state, so that the coagulated material is entirely immiscible with water.

Wash water is then run over the material on the mill and the mass is kneaded on the corrugated rolls until the excess of acid, or other coagulant, and of water-soluble material is washed out and carried away. Among the water-soluble materials thus washed out are the salts originally mixed with the starch. When all soluble matter has been removed by washing, the wash water is shut off and the working of the material on the rolls is continued with a slight amount of heat until a great portion of the excess water is removed. The material is then transferred to a rubber mill with smooth rolls and worked thereon at a temperature of about 120–140° F. until substantially all of the moisture is removed. The material is then finished and taken off the mill in the form of sheets, or in any other appropriate form.

The finished caoutchouc-like material is more opaque than natural crepe rubber, and apparently has less resiliency and toughness but somewhat the same tackiness. Upon standing in the atmosphere, its surface undergoes a slight change, possibly as the result of oxidation, or perhaps simply loss on the surface of a lingering trace of the solvent (e. g. benzol) used in the second stage of the process. In this finished form, the material may be stored indefinitely. If desired, an appropriate amount of sulphur for vulcanization may be worked into the material before it is taken off the finishing mill.

I now give a specific example of the practice of the invention, although it is to be understood that this example is purely illustrative and in no sense restrictive. The materials and proportions specified are those with which I have secured very satisfactory results in actual practice. It will be evident to those skilled in the art that similar and equally good results may be obtained with equivalent materials and proportions.

5 pounds of cassava or potato starch are intimately mixed dry with 4½ pounds of dry powdered calcium chloride, 1¼ pounds of dry powdered zinc chloride, and 10.32 ounces avoirdupois (6% by weight) of aluminum palmitate. The mixture of these materials is conveniently effected in a tightly closed tumbling barrel with or without stones or pebbles. The intimate mixture is normally obtained in about ten to fifteen minutes.

6,000 cc. (6⅓ quarts) of cold water is placed in a steam jacketed mixing or dough-kneading mill, and the mixing device started. The dry mixture of starch, chlorides and palmitate is then slowly added to the water. The addition is made very gradually to avoid, so far as possible, the formation of lumps. The solution of the chlorides causes a slight rise in temperature. The mixing is continued, without heating, until all visible lumps are disintegrated. This ordinarily takes from one-half to one hour.

Heat is then very gradually turned into the jacket of the mixing mill and the temperature raised first to about 120° F., then to about 140° F., and ultimately for a short period to 150–160° F. The temperature should not exceed 160° F. With cassava or potato starch, the mixing and heating takes from three to five hours.

The termination of the mixing and heating treatment is determined by the physical aspect of the batch or material undergoing treatment. Toward the end of the operation, the batch assumes a slightly brownish tinge, and the whole mass has assumed a sticky, opaque, mucilaginous appearance. Occluded air has difficulty escaping from the mass, and the turning mass adheres to the sides of the mill in long, stringy filaments. A sample tested between the thumb and finger may be drawn into thin filaments resembling spider-web threads or filaments.

The batch is then withdrawn from the mixing mill and permitted to cool to almost room temperature. It is then placed on cool rolls of a rubber mill and worked at gradually increasing temperature until it has attained a temperature of 140° F. Working of the material at this latter temperature is continued until a further increment of water is driven off. This may be determined by testing the material between the thumb and finger, where it gives a distinct snap when the thumb and finger are separated. The material on the mill becomes less sticky and may be touched with only a feeling of tackiness.

The temperature is then lowered to between 80° F. and 100° F., and about 1050 cc. of benzol is slowly worked into the batch on the mill. The mass immediately assumes different characteristics. It begins to act more like caoutchouc. Indeed, it is remarkably similar to natural caoutchouc in both appearance and physical characteristics on the mill. Occluded air snaps through the enfolding material with a sound similar to milling caoutchouc. The mass assumes a distinctly brownish tinge and looks like crepe rubber. The films surrounding air bubbles are elastic and very transparent, having a clear, glassy appearance. The temperature is gradually brought back to 140° F. Most of the white specks, formerly visible in the material, disappear, showing that the palmitate has been dissolved by the benzol. It is possible that at this stage the colloidal peptized palmitate disperses other colloidal material emanating from the starch paste. Tests at this stage customarily show free starch still existing in the mass.

When the fine particles of material have disappeared, and substantially all of the benzol has been evaporated, the mass is removed from the mill and placed in pans or trays to a depth of about one to two inches, and permitted to remain undisturbed for from thirty-six to forty-eight hours. A tough, non-sticky skin forms on the surface of the mass. This skin has a distinctly brownish color, while the mass underneath is much lighter in color. The material in the pans assumes by the end of twenty-four hours a very disagreeable odor. At the end of forty-eight hours, it ceases to give the characteristic violet coloration when tested with iodine solution. The absence of the iodine-starch reaction indicates that starch grains which had passed through the earlier stages unreacted upon have now been changed, possibly by some enzyme or bio-chemical reaction, into a form which is no longer starch but some degradation product thereof, possibly one of the hexosans or some water-soluble polysaccharide.

The material which has stood in pans for about forty-eight hours is now gradually placed on a rubber mill with corrugated rolls, and 2¼ pounds of boric acid carefully added at the same time. The boric acid coagulates the colloidal mass into a stiff, homogeneous body. The material is worked with a very slight heat on the rolls until the acid has coagulated all of the pasty material into a stiff colloidal form. The working is continued until it is safe to assume that the acid has reached every particle of the mass. During this working, the coagulated material breaks up into small pieces of irregular structure. Wash water is then turned onto the mill, and a milky solution begins to exude from the mass. The washing is continued until the wash water is no longer acid to litmus paper.

During the washing treatment, the chlorides added at the start of the process are washed out as well as the excess of coagulating acid and the soluble materials formed from the unconverted or unreacted-upon starch. Even the initial wash water gives no starch reaction with iodine. With the addition of wash water, the mass sheets on the mill and thereafter remains in a sheeted form.

At the finish of the washing operation, the corrugated rolls are heated and a portion of the water driven off. The material is then passed directly to a rubber mill with smooth rolls, and the heating and working continued until the mass sheets nicely and substantially all of the water is driven off.

Sulphur and other rubber compounding substances may be added directly on the finishing rubber mill, or the sheeted material may be taken off and stored until required for use. In this finished form, the caoutchouc-like material may be used in substantially the same manner as natural caoutchouc.

It is my belief that substantially all of the change of the carbohydrate of the starch to the hydrocarbon of the caoutchouc takes place in the first stage of the process. The fact that all of the starch is not changed over at the end of this first stage is only indicative that the starch itself is not uniform and does not uniformly react in the same manner and at the same rate.

The action of the mixed calcium chloride and zinc chloride is not completely understood. It is possible that these salts act as catalysts, but this has not been definitely determined. Other chlorides react in a similar manner but in a lesser degree. Many different chlorides have been investigated, and all seem to give results, but none give as satisfactory results as the calcium and zinc chlorides. Some chlorides form insoluble compounds which are difficult to wash out at the final stage. Other chlorides give an undesirable coloration and still others, such as potassium chloride, are too expensive. Iron and chromium chlorides cause discoloration and are likely to set up oxidation reactions which are undesirable.

It may be that the action of the chlorides is purely a phenomenon of dissolving. At certain concentrations during the primary conversion stage they may be true solvents for certain of the starch particles, as they are solvents for cellulose at certain concentrations. It may be that they simply act as peptizing agents to form the starch into a peptized gel. It may be that they only tend to provide a proper hydrogen ion concentration to peptize the starch into a gel, or they may act as true catalyzers.

It has been found that substantially all forms of starch may be made to react to form the caoutchouc-like material of the finished product, but all starches do not react in the same manner and do not give the same yields.

All of the metallic soaps in the nature of aluminum palmitate appear to bring the other colloids into a proper physical condition, but it has been found that the metallic soaps having substantial water-repellent power give the best results. Metallic soaps which have substantial affinity for water or a large water-holding capacity give relatively poor results. Thus metallic soaps like zinc stearate which mix with water only with great difficulty give better results than those which are more easily wetted with water.

The third or conditioning stage might be called the degradation stage, since it appears that what takes place in this stage is the degradation of the particles of the original starch, which have not been changed over to hydrocarbon, to a water-soluble form. It is not only possible but highly probable that this reaction breaks down the proteins and albuminoids of the starch and also the starch grains themselves which were not in such a form that they could be readily changed over to hydrocarbon. These grains may be composed of aggregates which have not been wetted through, or may be individual particles which have such a structural form as not to lend themselves readily to the reaction.

The exact chemical changes taking place during the various stages of the complete process are not now definitely known or fully understood. During the final heating after the coagulating agent has been added, there is given off a very pungent acrid odor somewhat resembling formaldehyde or formic acid and of a penetrating quality similar to some of the esters. It is possible that some reaction started in the earlier colloidal stages is completed after the colloidal matter has been coagulated into a consolidated mass and then exposed to the heat of the rolls.

It is possible and entirely likely that the periods of greatest change chemically are closely associated with the periods of greatest change physically and colloidally. Such periods occur in the primary conversion stage where the first colloid mass is formed, again at the stage where the metallic soap is peptized by its solvent and mixes with the other colloidal matter, and the final stage where the caoutchouc-like colloid is agglomerated or coagulated by acid or the like. All of these stages are accompanied by a radical change in physical characteristics of the mass and all are accomplished in a mildly heated state.

The finished caoutchouc-like material while vulcanizing like natural caoutchouc does not handle like natural caoutchouc in all respects. Especially is this true of the way the material works on the rolls of a rubber mill. The caoutchouc-like product of the invention is somewhat stiffer and more difficult to mill than natural caoutchouc. One of the most pronounced differences is in the behavior of the product of the invention and the behavior of natural caoutchouc which has been deprived of its natural resins by an extraction with acetone. A natural caoutchouc deprived of resins by acetone extraction and then subjected to vulcanization has substantially no tensile strength, being in fact weak, flabby and stringy with little or no resiliency. The addition of from 2 to 3% of a fatty acid in the nature of stearic acid or a proportional amount of zinc stearate returns to the acetone-extracted natural caoutchouc some, if not all, of its original characteristic qualities of strength and elasticity. On the other hand, the caoutchouc-like product of the invention after extraction of acetone soluble constituents is capable of being vulcanized with the production of vulcanized rubber possessing substantial tensile strength, although much inferior to vulcanized rubber produced from the original caoutchouc-like material.

The caoutchouc-like product of the invention is substantially neutral; its water extract having neither an acid nor alkaline reaction. It cures with good tensile strength, good elasticity and good aging qualities. Vulcanization takes place substantially faster than in the case of natural caoutchouc. A possible explanation of the acceleration of the rate of cure may be accounted for by the presence in the product of the invention of colloidal metallic soap. Such a soap once peptized by the use of a solvent in the nature of benzol may blend in a dispersed state with the colloidal material derived from the starch. It is possible that the peptized metallic soap acts as a protective colloid surrounding the globules of hydrocarbon of the caoutchouc-like material. Or it may be that an emulsion is formed with the hydrocarbon globule included in a protecting shell of peptized metallic soap. Evidence of this is present in the fact that benzol wets the material and is the peptizing agent for the metallic soap. Water, on the other hand, is repelled. Then, also, the boric acid, or equivalent coagulant, may chemically combine with either the metallic soap, the changed or converted starch, or with both, so that the newly formed complex double salts of boric acid may assist in the vulcanization.

I claim:

1. The method of making a caoutchouc-like material which comprises mixing starch with water in the presence of a metallic soap having substantial water-repellent power and one or more soluble metallic chlorides adapted to form a mucilaginous pasty mass and convert a large proportion of the starch into a caoutchouc-like substance, treating said pasty mass with a solvent for the metallic soap adapted to render the conversion product immiscible with water, coagulating the conversion product, and washing the resulting coagulated caoutchouc-like material.

2. The method of making a caoutchouc-like material which comprises mixing starch with water in the presence of a metallic soap having substantial water-repellent power and one or more soluble metallic chlorides adapted to gelatinize the mixture until a mucilaginous pasty mass and to convert a large proportion of the starch into a caoutchouc-like substance, mechanically working a solvent for the metallic soap into said pasty mass whereupon said caoutchouc-like substance becomes immiscible with water, mechanically working a coagulant into the conversion product, and separating water miscible substances from the now coagulated caoutchouc-like material by washing.

3. The method of making a caoutchouc-like material which comprises mixing starch with water in the presence of one or more soluble metallic chlorides adapted to gelatinize the mixture at a temperature not exceeding 160° F. until a mucilaginous pasty mass is formed, mechanically working the mass in the presence of a metallic soap having substantial water-repellent power and a solvent therefor; exposing the resulting mass in relatively shallow layers to atmospheric air then mechanically working a caoutchouc coagulant into the mass, and washing the same with water.

4. The method of making a caoutchouc-like material which comprises mixing starch with water in the presence of a metallic soap having substantial water-repellent power and one or more soluble metallic chlorides adapted to gelatinize the mixture at a temperature not exceeding 160° F. until a mucilaginous pasty mass is formed, working the mass on a rubber mill in the presence of a solvent for the metallic soap, exposing the resulting mass in relatively shallow layers to atmospheric air, then working the mass on a rubber mill in the presence of a caoutchouc coagulant, and washing the mass with water.

5. The method of making a caoutchouc-like material which comprises mixing starch with water in the presence of calcium chloride and zinc chloride at a temperature not exceeding 160° F. until a mucilaginous pasty mass is formed, working the mass on a rubber mill in the presence of aluminum palmitate and benzol, exposing the resulting mass in relatively shallow layers to atmospheric air, then working boric acid into the mass on a rubber mill, and washing the mass on the rubber mill with water.

6. The method of making a caoutchouc-like material which comprises mixing starch with water in the presence of calcium chloride, zinc chloride and aluminum palmitate until a mucilaginous pasty mass is formed, working benzol into said pasty mass on a rubber mill, maintaining the resulting mass exposed to atmospheric air in relatively shallow layers, then working boric acid into the mass on a rubber mill, and finally washing the mass with water.

7. The method of making a caoutchouc-like material which comprises mixing starch with water in the presence of one or more soluble metallic chlorides adapted to gelatinize the mixture until a mucilaginous pasty mass is formed, mechanically working said pasty mass in the presence of aluminum palmitate, and subsequently treating the resulting product with a coagulating agent for the caoutchouc-like material therein.

ROBERT BEYER.